United States Patent
Takai et al.

(10) Patent No.: US 7,538,041 B2
(45) Date of Patent: May 26, 2009

(54) MAGNETIC RECORDING MEDIUM, METHOD OF MANUFACTURING THE SAME, AND INTERMEDIATE FOR MAGNETIC RECORDING MEDIUM

(75) Inventors: Mitsuru Takai, Tokyo (JP); Kazuhiro Hattori, Tokyo (JP); Takahiro Suwa, Tokyo (JP); Shuichi Okawa, Tokyo (JP)

(73) Assignee: TDK Corporation, Tokyo (JP)

( * ) Notice: Subject to any disclaimer, the term of this patent is extended or adjusted under 35 U.S.C. 154(b) by 638 days.

(21) Appl. No.: 11/206,874

(22) Filed: Aug. 19, 2005

(65) Prior Publication Data
US 2006/0063042 A1    Mar. 23, 2006

(30) Foreign Application Priority Data
Sep. 22, 2004    (JP)    ............... 2004-275682

(51) Int. Cl.
*H01L 21/302* (2006.01)
(52) U.S. Cl. ............ 438/720; 438/3; 438/714; 438/738
(58) Field of Classification Search ........... 438/706, 438/710, 712, 714, 692, 693, 3, 9, 720, 738, 438/740; 216/67, 75
See application file for complete search history.

(56) References Cited

U.S. PATENT DOCUMENTS

| 6,014,296 | A | 1/2000 | Ichihara et al. |
| 6,583,957 | B1 | 6/2003 | Takeshita et al. |
| 6,586,044 | B1 | 7/2003 | Takeshita et al. |
| 2003/0138666 | A1* | 7/2003 | Gouke et al. ............. 428/694 T |
| 2004/0201070 | A1* | 10/2004 | Deak .......................... 257/421 |
| 2005/0191526 | A1 | 9/2005 | Fujita et al. |
| 2005/0196650 | A1 | 9/2005 | Suwa et al. |
| 2005/0213239 | A1 | 9/2005 | Hibi et al. |
| 2005/0225898 | A1* | 10/2005 | Huang et al. ................ 360/126 |

FOREIGN PATENT DOCUMENTS

| JP | 9-97419 | 4/1997 |
| JP | 09-138943 | 5/1997 |
| JP | 2000-132824 | 5/2000 |
| JP | 2000-195042 | 7/2000 |
| JP | 2001-134918 | 5/2001 |
| JP | 2002-511630 | 4/2002 |

OTHER PUBLICATIONS

U.S. Appl. No. 11/206,874, filed Aug. 19, 2005, Takai et al.

* cited by examiner

*Primary Examiner*—Lan Vinh
(74) *Attorney, Agent, or Firm*—Oblon, Spivak, McClelland, Maier & Neustadt, P.C.

(57) ABSTRACT

A magnetic recording medium is provided in which a magnetic recording layer 5 is provided in a predetermined concavo-convex pattern on a substrate 1A, a concave portion in a concavo-convex pattern is filled with a non-magnetic material, and a non-magnetic layer 16 formed of the non-magnetic material positioned at the bottom surface of the concave portion in the non-magnetic materials is formed on a convex portion of the concavo-convex pattern while surface of the convex portion and the concave portion is substantially flattened, and a thickness of the non-magnetic layer 16 is 1 nm or less.

2 Claims, 6 Drawing Sheets

20

21

MAGNETIC RECORDING MEDIUM, METHOD OF MANUFACTURING THE SAME, AND INTERMEDIATE FOR MAGNETIC RECORDING MEDIUM

BACKGROUND OF THE INVENTION

The present invention relates to a magnetic recording medium, a method of manufacturing the same, and an intermediate for the magnetic recording medium, and more particularly, to a magnetic recording medium having good magnetic reproducing characteristics without damaging a magnetic recording layer, and a method of manufacturing the same.

The significant enhancement in an areal density has been promoted for a magnetic recording medium such as a hard disk by using a means improving minuteness of magnetic particles constituting a magnetic recording layer, a change in a material, minuteness of head processing and so forth, so that a further enhanced areal density is expected in the future. However, the improving means employed up to the recent years faces limitation in enhancing the areal density because of problems of head processing limits, side fringe resulted from an enlarged magnetic field, crosstalk or the like, so that it is not possible to further enhance the areal density using the conventional means.

To cope with such a problem, a discrete track type magnetic recording medium has been proposed as one of means capable of enhancing an areal density of a magnetic recording medium, for example, see JP-A-9-97419 and JP-A-2000-195042. This discrete track type magnetic recording medium has a magnetic recording layer formed in a concentric track pattern, and a non-magnetic layer continuously filled within a concave portion between adjacent tracks in a track direction to separate the concentric track patterns.

In manufacturing the discrete track type magnetic recording medium, in order to suppress a flying deviation of a head slider with a magnetic bead mounted thereon, it is general to fill a concave portion between adjacent tracks formed in a concentric track pattern with a non-magnetic layer to flatten a top surface of the magnetic recording medium. A method of filling the concave portion between adjacent tracks with the non-magnetic layer employs a film formation technique such as sputtering utilized in a semiconductor fabrication field. According to such a film formation technique, the non-magnetic layer is formed not only between the tracks but also on a top surface of the magnetic recording layer, which causes to increase a gap length between the magnetic head flied over the magnetic recording medium by airflow and the magnetic recording layer constituting the magnetic recording medium when a thickness of the non-magnetic layer on the magnetic recording layer is as thick as about 10 nm as disclosed in JP-A-2000-195042 (that is, it causes to increase the spacing loss between the magnetic head and the magnetic recording layer), so that the detecting sensitivity is deteriorated or a foreign substance may be readily deposited thereon.

To cope with this problem, it is preferable to make thinner the non-magnetic layer formed on the magnetic recording layer while flattening its surface, and, for example, a dry etching method is employed for the flattening means.

However, in the above-described flattening using the dry etching method, it is difficult to control the etching speed, and the magnetic recording layer may be damaged by overetching. In addition, in a case in which the overetching is performed, it is likely to have a step between the magnetic recording layer and the non-magnetic layer filled in the concave portion between the tracks. As a result, it makes unstable the magnetic head flying above the resultant magnetic recording medium by airflow, so that it is likely to adversely affect the flying characteristics of the magnetic head.

Accordingly, it is required not to damage the magnetic recording layer as well as control a thickness of the non-magnetic layer formed on the magnetic recording layer so as to suppress deterioration of the magnetic recording and reproducing characteristics resulted from the large spacing loss between the magnetic head and the non-magnetic layer to the maximum.

SUMMARY OF THE INVENTION

In order to achieve the above-mentioned object, a first purpose of the present invention is to provide a magnetic recording medium having good magnetic recording and reproducing characteristics. Further, a second purpose of the present invention is to provide a method of manufacturing the magnetic recording medium. Furthermore, a third purpose of the present invention is to provide an intermediate for the magnetic recording medium allowing the magnetic recording medium to be manufactured.

A magnetic recording medium of the present invention for achieving the first purpose is a magnetic recording medium in which a magnetic recording layer in a predetermined concavo-convex pattern is provided on a substrate, a concave portion in the concavo-convex pattern is filled with non-magnetic materials, and a non-magnetic layer formed of the non-magnetic material positioned at the bottom surface of the concave portion is formed on a convex portion of the concavo-convex pattern while surface of the convex portion and the concave portion is substantially flattened. In this case, a thickness of the non-magnetic layer is 1 nm or less.

According to the present invention, the non-magnetic layer formed of the non-magnetic material positioned at the bottom surface of the concave portion in the layers formed of the non-magnetic materials filling the concave portion is formed on the convex portion, and a thickness of the non-magnetic layer is 1 nm or less, so that a magnetic recording medium having the magnetic recording layer without damage can be formed. In addition, according to the present invention, the concave portion is filled with the non-magnetic material and surface of the convex portion and the concave portion is substantially flattened, so that flying of the magnetic head above the magnetic recording medium by airflow becomes stabilized. According to the magnetic recording medium of the present invention, the non-magnetic layer formed of the non-magnetic material positioned on the bottom surface of the concave portion is formed on the magnetic recording layer forming the convex portion to have a thickness of 1 nm or less. However, a total thickness is thin and becomes flattened even when a plurality of protective layers is formed thereon, so that the spacing loss between the magnetic recording layer and the magnetic head can be made to be small, thereby suppressing deterioration of the magnetic recording and reproducing characteristics to the maximum.

In addition, a magnetic recording medium of the present invention for achieving the first purpose is a magnetic recording medium in which a magnetic recording layer in a predetermined concavo-convex pattern is provided on a substrate, a concave portion in the concavo-convex pattern is filled with non-magnetic materials, and a non-magnetic layer formed of the two laminated non-magnetic materials positioned at the bottom surface of the concave portion among layers formed of the non-magnetic materials is formed on a convex portion of the concavo-convex pattern while surface of the convex portion and the concave portion is substantially flattened. In this case, a thickness of the non-magnetic layer is 1 nm or less.

According to the present invention, the non-magnetic layer formed of two laminated non-magnetic materials at the bottom surface of the concave portion among layers formed of the non-magnetic materials filling the concave portion is formed on the convex portion, and a thickness of the non-magnetic layer is 1 nm or less, so that the magnetic recording medium having the magnetic recording layer without damage can be formed. In addition, according to the present invention, surface of the convex portion and the concave portion is substantially flattened as described above, so that flying of the magnetic head above the magnetic recording medium by the airflow becomes stabilized. The spacing loss between the magnetic recording layer and the magnetic head can be made to be small in such a magnetic recording medium of the present invention, thereby suppressing deterioration of the magnetic recording and reproducing characteristics to the maximum.

A method of manufacturing a magnetic recording medium for achieving the second purpose is a method which includes: a step of forming a magnetic recording layer in a predetermined concavo-convex pattern on a substrate, a step of forming a first non-magnetic layer on a concavo-convex pattern, a step of forming an etching monitoring layer on the first non-magnetic layer, a step of forming a second non-magnetic layer on the etching monitoring layer, and a step of etching at least the second non-magnetic layer formed on the magnetic recording layer forming a convex portion of the concavo-convex pattern. In this case, a concave portion of the concavo-convex pattern is filled with at least one kind or more of the non-magnetic layer formed in each step after the first non-magnetic layer forming step, the etching monitoring layer forming step, and the second non-magnetic layer forming step are carried out, and the etching step is a step of substantially flattening surface on the convex portion and the concave portion, and includes a step of adjusting to zero or decreasing an etching speed of the etching monitoring layer, an etching speed of the first non-magnetic layer, or an etching speed of the second non-magnetic layer when the second non-magnetic layer remains on the concave portion of the concavo-convex pattern after the etching monitoring layer provided on the magnetic recording layer forming the convex layer starts to be etched.

According to the present invention, after the etching monitoring layer formed on the magnetic recording layer forming the convex portion starts to be etched, a step of adjusting an etching speed is included, which adjusts to zero or decrease an etching speed of the etching monitoring layer, an etching speed of the first non-magnetic layer, or an etching speed of the second non-magnetic layer when the second non-magnetic layer remains on the concave portion of the concavo-convex pattern, so that etching can be implemented at a fast etching rate until the etching monitoring layer on the magnetic recording layer forming the convex portion is detected while a residual layer on the magnetic recording layer can be readily controlled to have a thin and uniform thickness. In addition, according to the present invention, the etching step is a step of substantially flattening surface of the convex portion and the concave portion, so that it becomes facilitated to flatten the surface of the magnetic recording medium. According to such a fabrication method of the present invention, a total thickness of a plurality of layers on the magnetic recording layer forming the convex portion can be made to be thin to the maximum even when a protective layer or the like is further formed on the remaining layer on the magnetic recording layer, so that the magnetic recording medium allowing the space loss between the magnetic recording layer and the magnetic head to be small can be readily manufactured.

According to the present invention, the non-magnetic layer having the single structure or the two-layer structure exists on the magnetic recording layer after the etching step is carried out, and the magnetic recording medium in which the non-magnetic layer has a thickness of 1 nm or less can be readily manufactured, so that the magnetic recording medium having the magnetic recording layer without damage and having good magnetic recording characteristics can be manufactured.

According to the method of manufacturing the magnetic recording medium of the present invention, the first non-magnetic layer and the second non-magnetic layer are formed of the same material.

According to the present invention, the first non-magnetic layer and the second non-magnetic layer provided on the magnetic recording layer are formed of the same material, so that it is not necessary to significantly change an etching condition in the etching step, thereby capable of readily manufacturing the magnetic recording medium. In addition, an etching rate of the first non-magnetic layer can be made to be the same as that of the second non-magnetic layer after the step of adjusting the etching speed even when the second non-magnetic layer exists within the concave portion, so that it becomes more facilitated to flatten the surface of the magnetic recording medium.

An intermediate for the magnetic recording medium for achieving the third purpose of the invention is an intermediate which comprises a magnetic recording layer in a predetermined concavo-convex pattern formed on a substrate, non-magnetic materials filled in a concave portion of the concavo-convex pattern, and a non-magnetic layer formed on the convex portion of the concavo-convex pattern. In this case, the non-magnetic layer is composed of at least three layers, and an intermediate layer of the three layers has an element different from elements of two top and bottom layers.

In a method of manufacturing a magnetic recording medium using the intermediate for the magnetic recording medium of the present invention, an intermediate layer of the non-magnetic layer composed of at least three layers has an element different from elements of the top and bottom layers, so that the intermediate layer can serve as an etching monitoring layer to detect the element during the etching step, which readily controls a thickness of the remaining layers on the magnetic recording layer after etching. As a result, by means of the intermediate for the magnetic recording medium, it becomes possible to etch the remaining layer on the magnetic recording layer with high precision, thereby manufacturing the magnetic recording medium having the magnetic recording layer without damage and having good magnetic recording characteristics.

In addition, in the present application, 'the magnetic recording layer in a predetermined concavo-convex pattern formed on the substrate' includes, in addition to a case in which the magnetic recording layer divided into a plurality of recording elements is provided in a predetermined pattern on the substrate, a case that the magnetic recording layer is provided of which a portion is partially divided, a case in which the magnetic recording layer is continuously formed on each portion of the substrate like the magnetic recording layer having a spiral vortex shape, and a case in which the magnetic recording layer is formed in a continuous concavo-convex pattern of which a convex portion and concave portion are formed. In addition, in the present application, 'the convex portion of the concavo-convex pattern' means a protruding portion of a concavo-convex shape in a cross-sectional surface perpendicular to the surface. In addition, in the present application, when a taper angle as shown in FIG. 8 is present in the convex portion 82 of the concavo-convex pattern composed of the convex portion 82 and the concave portion 81, the convex portion 82 includes the taper portion.

As described above, according to the magnetic recording medium of the present invention, the magnetic recording layer is not damaged, so that the magnetic recording medium is prevented from deterioration of the magnetic recording and reproducing characteristics. In addition, surface on the convex portion and the concave portion is substantially flattened in the magnetic recording medium of the present invention, so that flying of the magnetic head above the magnetic recording medium by means of the airflow becomes stabilized. In addition, a thickness of the non-magnetic layer formed on the magnetic recording layer forming the convex portion is thin and flattened, so that the spacing loss between the magnetic recording layer and the magnetic head can be made to be small when the magnetic head flies above the magnetic recording medium, thereby capable of suppressing deterioration of the recording and reproducing characteristics to the maximum.

According to the method of manufacturing the magnetic recording medium of the present invention, etching can be effectively implemented at a fast etching rate until the etching monitoring layer on the magnetic recording layer forming the convex portion is detected while a residual layer on the magnetic recording layer can be readily controlled to have a thin and uniform thickness. In addition, it becomes facilitated to flatten the surface of the magnetic recording medium. According to the manufacturing method of the present invention, a total thickness of the non-magnetic layer on the magnetic recording layer forming the convex portion can be made to be thin to the maximum even when a protective layer is formed on the residual layer on the magnetic recording layer, so that the magnetic recording medium capable of making small the spacing loss between the magnetic recording layer and the magnetic head can be readily manufactured. When the magnetic recording medium manufactured in this way is applied to a magnetic recording and reproducing device, deterioration of the magnetic recording and reproducing characteristics can be suppressed to the maximum.

According to the intermediate for the magnetic recording medium of the present invention, the intermediate layer having a different element serves as an etching monitoring layer to detect the element during the subsequent etching step, so that a thickness of the layer remaining on the magnetic recording layer after etching can be readily controlled. As a result, by means of such an intermediate for a magnetic recording medium, the thickness of the layer remaining on the magnetic recording layer can be etched with high precision, so that the magnetic recording medium having the magnetic recording layer without damage and having good magnetic recording characteristics can be readily manufactured. In addition, by means of the intermediate for the magnetic recording medium of the present invention, the magnetic recording medium capable of making small the spacing loss can be readily provided.

DETAILED DESCRIPTION OF THE PREFERRED EMBODIMENTS

Hereinafter, a magnetic recording medium of the present invention, a method of manufacturing the same, and an intermediate for the magnetic recording medium will be described in detail.

(Magnetic Recording Medium)

The magnetic recording medium of the present invention means a magnetic recording medium, such as a hard disk, a plastic disk, a magnetic tape or the like using only magnetism for recording and reading information, but is not limited thereto, and may also include a magneto-optical (MO) recording medium using light together with the magnetism, and a heat-assisting-type recording medium using the heat together with the magnetism.

Figure 1A:
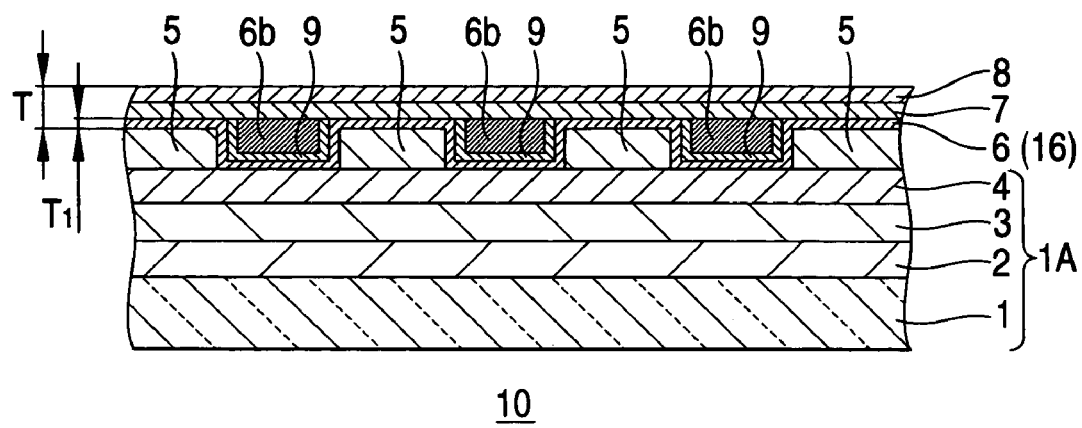
FIG. 1 is a schematic cross-sectional view showing an example of a magnetic recording medium of the present invention.
Figure 2A:
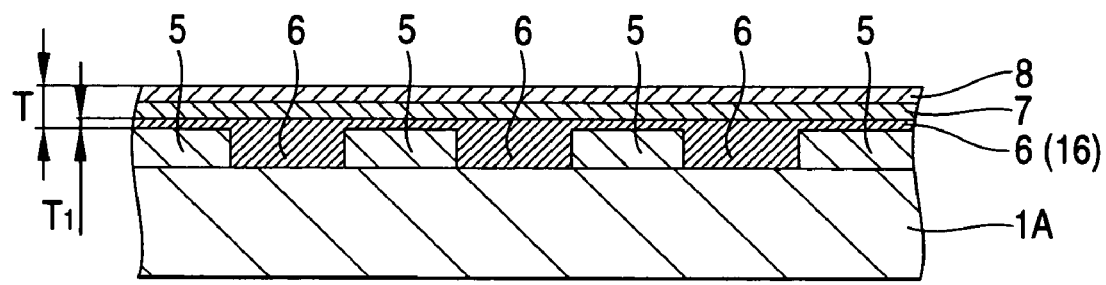
FIG. 2 is a schematic cross-sectional view showing another example of a magnetic recording medium of the present invention.
Figure 2B:
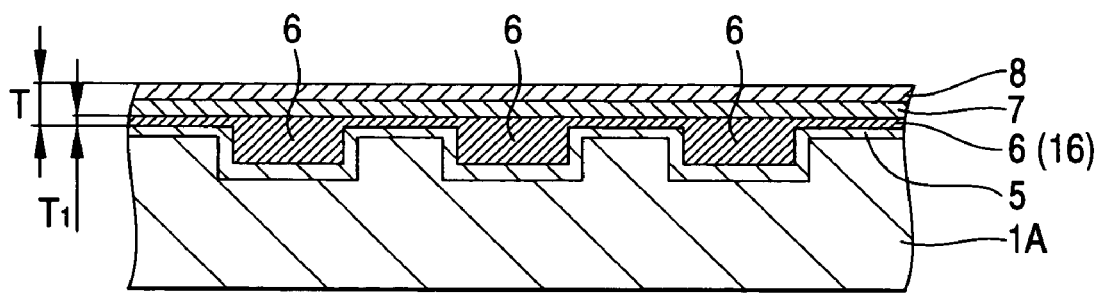

A magnetic recording medium according to a preferred embodiment of the present invention is a perpendicular recording type magnetic recording medium having a soft magnetic layer, and as shown in FIGS. 1A, 2A, and 2B for the first, third, and fourth embodiments, respectively, a magnetic recording layer 5 on a substrate 1 is provided in a predetermined concavo-convex pattern, a concave portion of the concavo-convex pattern is filled with a non-magnetic material, and a non-magnetic layer 16 (first non-magnetic layer 6) formed of the non-magnetic material positioned at the bottom surface of the concave portion among layers formed of the non-magnetic material is formed on a convex portion of the concavo-convex pattern while surface on the convex portion and the concave portion is substantially flattened. In addition, according to the present invention, a thickness of the non-magnetic layer 16 (first non-magnetic layer 6) is 1 nm or less.

Figure 1B:
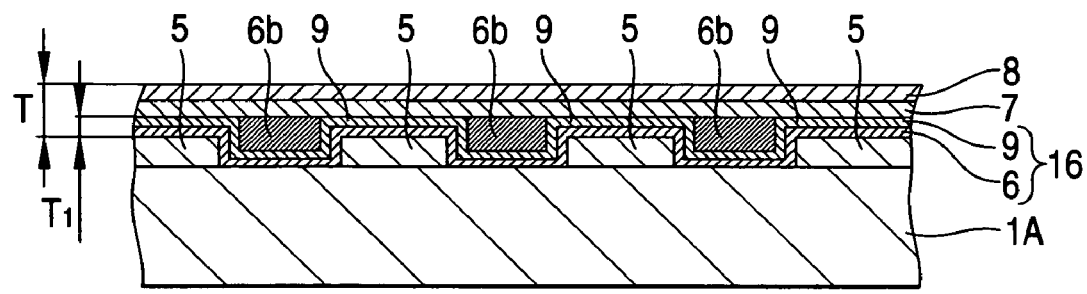

In addition, as shown in FIG. 1B for the second embodiment, a magnetic recording medium according to another preferred embodiment of the present invention is a magnetic recording medium in which a magnetic recording layer 5 on a substrate 1 is provided in a predetermined concavo-convex pattern, a concave portion of the concavo-convex pattern is filled with a non-magnetic material, and a non-magnetic layer 16 (the first non-magnetic layer 6 and an etching monitoring layer 9) formed of two non-magnetic materials laminated on the bottom surface of the concave portion among layers formed of the non-magnetic material is formed on a convex portion of the concavo-convex pattern while surface on the convex portion and the concave portion is substantially flattened. Further, according to the present invention, a thickness of the non-magnetic layer 16 (the first non-magnetic layer 6 and the etching monitoring layer 9) is 1 nm or less.

First, the respective embodiments of the magnetic recording medium of the present invention will be described in detail with reference to drawings. FIGS. 1 and 2 are cross-sectional views schematically illustrating respective examples of embodiments of the magnetic recording medium of the present invention, FIG. 1A corresponds to a first embodiment, FIG. 1B corresponds to a second embodiment, FIG. 2A corresponds to a third embodiment, and FIG. 2B corresponds to a fourth embodiment, which will be sequentially described. Referring to FIG. 1A, a reference numeral 1A denotes 'a substrate 1A' in which a base layer 2, a soft magnetic layer 3, and an alignment layer 4 are sequentially laminated on the substrate 1 in its entirety for simplicity of description, so that the reference numerals such as the substrate 1, the base layer 2, the soft magnetic layer 3, and the alignment layer 4 are not shown in FIGS. 1B, 2A, and 2B while using the substrate 1A.

As shown in FIG. 1A, in the magnetic recording medium 10 according to the first embodiment, a magnetic recording layer 5 on a substrate 1A is provided in a predetermined concavo-convex pattern, and a concave portion of the concavo-convex pattern is filled with a non-magnetic material, and a non-magnetic layer 16 (first non-magnetic layer 6) formed of the non-magnetic material positioned at the bottom surface of the concave portion among layers (6, 9, and 6b) formed of the non-magnetic material is formed to have a single layer structure on a convex portion of the concavo-convex pattern. In the magnetic recording medium 10, the concave portion of the concavo-convex pattern is filled with the first non-magnetic layer 6, the etching monitoring layer 9, and the second non-magnetic layer 6b laminated on the substrate 1A in this order.

As shown in FIG. 1B, in the magnetic recording medium 11 according to the second embodiment, a magnetic recording layer 5 on a substrate 1A is provided in a predetermined concavo-convex pattern, and a concave portion of the concavo-convex pattern is filled with a non-magnetic material, and a non-magnetic layer 16 (a first non-magnetic layer 6 and an etching monitoring layer 9) formed of two non-magnetic materials positioned at the bottom surface of the concave portion among layers (6, 9, and 6b) formed of the non-magnetic materials is formed to have a two-layer structure on a convex portion of the concavo-convex pattern. In the magnetic recording medium 11, the concave portion of the concavo-convex pattern is filled with the first non-magnetic layer 6, the etching monitoring layer 9, and the second non-magnetic layer 6b laminated on the substrate 1A in this order.

As shown in FIG. 2A, in a magnetic recording medium 20 according to the third embodiment, a magnetic recording layer 5 on a substrate 1A is provided in a predetermined concavo-convex pattern, and a concave portion of the concavo-convex pattern is filled with a non-magnetic material, and a non-magnetic layer 16 (first non-magnetic layer 6), having a single layer structure, formed of the non-magnetic material is formed on a convex portion of the concavo-convex pattern. In addition, a cross-section view of the magnetic recording medium 20 is illustrated when the magnetic recording layer does not exist between the magnetic recording layers 5 and 5 formed in a predetermined concavo-convex pattern on the substrate 1A.

As shown in FIG. 2B, in a magnetic recording medium 21 according to the fourth embodiment, a concavo-convex pattern is formed in the substrate 1A, and a magnetic recording layer 5 is formed with a film on the substrate 1A in accordance with the concavo-convex pattern, which is referred to as a PERM type, the other structure is the same as that of the magnetic recording medium 20 according to the third embodiment.

In the respective magnetic recording mediums 10, 11, 20, and 21 according to the above-mentioned first to fourth embodiments, the non-magnetic layer 16 having the single layer or double-layer structure formed of the non-magnetic material which has filled the concave portion is provided on the magnetic recording layer for forming the convex portion of the concavo-convex pattern, and a thickness $T_1$ of the non-magnetic layer 16 is 1 nm or less. The magnetic recording medium having such characteristics has the non-magnetic layer 16 having the thickness of 1 nm or less, so that the magnetic recording layer having no damage can be formed to suppress deterioration of the magnetic recording and reproducing characteristic to the maximum.

In the above-described first to fourth embodiments, a surface of the convex portion and the concave portion in the concavo-convex pattern is substantially flattened without being stepped. In addition, in the second embodiment, a surface of the non-magnetic layer 16 composed of the first non-magnetic layer 6 and the etching monitoring layer 9 formed on the convex portion of the concavo-convex pattern, and a surface of the non-magnetic layer composed of the first non-magnetic layer 6, the etching monitoring layer 9, and the second non-magnetic layer 6b filled in the concave portion is substantially flattened without being stepped. Even in any case of them, a protective layer 7 and a lubrication layer 8 are formed to cover the flattened surface. According to such a magnetic recording medium, flying of the magnetic head above the magnetic recording medium by the airflow can be stabilized.

In addition, the thickness $T_1$ of the non-magnetic layer 16 is 1 nm or less in the magnetic recording medium of the present invention, so that a total thickness from the magnetic recording layer 5 to the top surface of the magnetic recording medium can be made to be small even though the protective layer 7 and the lubrication layer 8 are further formed on the non-magnetic layer, thereby making small the spacing loss between the magnetic recording layer and the magnetic head.

Hereinafter, a perpendicular recording type magnetic recording medium 10 having the soft magnetic layer 3 will be mainly described with reference to FIG. 1A, but the magnetic recording medium of the present invention may be a longitudinal recording type magnetic recording medium, or may be a magnetic recording medium 21 in which a magnetic recording layer exists in the concave portion of the concavo-convex pattern, as shown in FIG. 2B.

Next, each layer constituting the magnetic recording medium of the present invention will be described.

The substrate 1 is typically formed as a disk shape, and preferably, it is extremely smooth and has no undulation so as to allow low flying of the magnetic head above the magnetic recording medium by airflow. A glass substrate, or a NiP plated Al—Mg alloy substrate is preferably employed as the substrate 1. In particular, the glass substrate has the low surface roughness to facilitate easy obtainment of the substrate having the high surface smoothness, and has a good impact-resistant property, so that it is preferably employed in a small-sized magnetic recording medium.

The base layer 2 is provided for alignment control of the soft magnetic layer 3 formed thereon, the soft magnetic layer 3 is provided for forming a magnetic circuit between the magnetic heed and the magnetic recording medium, and the alignment layer 4 is provided for alignment control of the magnetic recording layer 5 formed thereon.

The magnetic recording layer 5 is provided in a predetermined pattern as a magnetic recording layer of a hard disk drive or the like. For example, in a discrete track type magnetic recording medium, the magnetic recording layer is formed in a concentric pattern at a fine interval in a diameter direction of a track for recording and reproducing magnetic recording information in a data track region constituting the magnetic recording medium. On the other hand, the magnetic recording layer is formed in a pattern to be a reference of tracking control for on-tracking the magnetic head to a predetermined data track in a servo pattern region constituting the magnetic recording medium. In addition, in a discrete bit type magnetic recording medium, the magnetic recording layer is formed in a track pattern at a fine interval in a circumference direction and a diameter direction of the track in the data track region constituting the magnetic recording medium. On the other hand, the magnetic recording layer is formed in a pattern corresponding to the predetermined servo information in the servo pattern region constituting the magnetic recording medium.

For example, a Co—Cr based multicomponent alloy, such as CoCrTa, CoCrPt, CoCrPtTa or the like, may be preferably employed for a material of forming the magnetic recording layer 5, which is formed within a thickness range of 5 nm to 30 nm by a film formation means such as a sputtering method and an etching means. In addition, a concentric shaped pattern of the magnetic recording layer (which is a pattern of a portion in charge of magnetic recording formed by the magnetic recording layer 5, which is also referred to as 'a magnetic recording layer pattern' or 'a track pattern') is formed, for example, within a pattern width of 5 nm to 300 nm and a pattern pitch of 10 nm to 500 nm in the data track region, and a magnetic recording layer pattern having various shapes is formed within a pattern width of 15 nm to 1000 nm and a pattern pitch of 30 nm to 2000 nm in the servo pattern region.

The non-magnetic layer 16 is a layer formed of a non-magnetic material positioned at the bottom surface of the concave portion among the non-magnetic materials filled in the concave portion, and is provided on the magnetic recording layer 5 for forming the convex portion of the concavo-convex pattern. The non-magnetic layer 16 described herein may refer to the single layer structure composed of the first non-magnetic layer 6 as shown in FIGS. 1A, 2A, and 2B or the two-layer structure composed of the first non-magnetic layer 6 and the etching monitoring layer 9 as shown in FIG. 1B. The magnetic recording medium of the present invention includes at least the non-magnetic layer 16 formed on the convex portion, so that the magnetic recording layer can be prevented from being damaged by etching, depending on the presence of the non-magnetic layer 16, which results in implementing the magnetic recording medium capable of preventing the magnetic recording and reproducing characteristics from deteriorating.

The first non-magnetic layer 6 is one of non-magnetic layers filling the concave portions of the concavo-convex pattern, and is provided on the magnetic recording layer 5 for forming the convex portion of the concavo-convex pattern. The first non-magnetic layer 6 may be directly formed on the magnetic recording layer 5 for forming the convex portion or may be formed with another layer interposed therebetween. The first non-magnetic layer 6 is a layer positioned at the bottom surface of the substrate among non-magnetic materials filling the concave portion of the concavo-convex pattern. The non-magnetic materials for forming the first non-magnetic layer 6 may include, for example, silicon dioxide ($SiO_2$), Indium (In), Tin-doped Indium oxide (ITO), $Al_2O_3$, TiN, TaSi alloy, Ta, MgO, SiC, TiC or the like, which is formed by a film formation means using a sputtering method.

A material for forming the first non-magnetic layer 6 is preferably a compound containing one material or more selected from oxides ($SiO_2$, ITO, $Al_2O_3$, MgO or the like), nitrides (TiN or the like), and carbides (SiC, TiC or the like) in the above-described various non-magnetic materials. These compounds themselves have good chemical stability and also do not allow corrosion resulted from a contact with the magnetic recording layer 5 having a metal component, so that a magnetic recording medium having the good chemical stability can be provided. In the present invention, a non-magnetic material particularly having $SiO_2$ as its main component is preferably used. Since $SiO_2$ can be readily processed by etching, it allows the flattening process to be readily performed by controlling the etching condition. In addition, $SiO_2$ has a good adhesive property with the magnetic recording layer 5, and can advantageously form the first non-magnetic layer 6 in which the crystal grain growth is suppressed.

In addition, a non-magnetic material having the amorphous structure or having a fine crystalline state may be preferably employed in the first non-magnetic layer 6. When the first non-magnetic layer 6 is formed of the crystalline material, etching may be carried out along the grain boundary which the crystalline material has to thus degrade the surface roughness of the etched surface at the time of etching the formed first non-magnetic layer 6. However, the material having the fine crystalline state is employed which is not substantially affected by the presence of the material having the amorphous structure or the grain boundary, so that a phenomenon of degrading the surface roughness dose not readily occur. Specific examples of the non-magnetic material having the amorphous structure or the fine crystalline state may include C, Si, $SiO_2$, $Al_2O_3$, TaSi alloy, TbFeCo alloy, CoZr alloy or the like, which may be formed by a film formation means using a sputtering method. In addition, the material having the fine crystalline state means a material which does not have a crystalline peak in X ray diffraction.

The protective layer 7 is provided for ensuring sliding-resistant characteristics by protecting a surface of the magnetic recording medium in cooperation with the lubrication layer 8 below the protective layer. In particular, it is provided so as to prevent the damage of the magnetic recording medium when the magnetic recording medium is in contact with a head slider mounted with a magnetic head. A material for forming the protective layer 7 may include a hardened carbon layer referred to as a diamond-like carbon (hereinafter, referred to as 'DLC'), zirconium dioxide ($ZrO_2$), silicon dioxide ($SiO_2$) and so forth, which are formed by a film formation means using a chemical vapor deposition (CVD) method, a sputtering method or the like. In addition, the DLC is an amorphous structure layer having carbon as its main component, which is a carbon material showing a hardness of about $2 \times 10^9$ to $8 \times 10^{10}$ Pa in a Vickers hardness measurement.

The lubrication layer 8 is provided for ensuring a sliding-resistant characteristic by protecting a surface of the magnetic recording medium in cooperation with the protective layer 7. A material for forming the lubrication layer 8 may include a liquid fluoride based compound such as perfluoropolyether (PFPE), which is formed by a film formation means using a dipping method or the like.

In the present invention, the non-magnetic layer 16 provided on the magnetic recording layer 5 for forming the convex portion of the concavo-convex pattern preferably has a thickness of 1 nm or less. Since such a thin non-magnetic layer 16 is formed on the convex portion, a total thickness T of the protective layer 7 or the lubrication layer 8 formed thereon including the non-magnetic layer becomes thin. According to the magnetic recording medium, the spacing loss between the magnetic recording medium and the magnetic head mounted in the head slider can be made to be small. In addition, the lowest limit of the thickness of the non-magnetic layer 16 is preferably 0.1 nm. When the thickness of the non-magnetic layer 16 is less than 0.1 nm, the magnetic recording layer 5 provided right below the non-magnetic layer 16 may be damaged due to etching.

In addition, in the present invention, since the thickness $T_1$ of the non-magnetic layer 16 (the first non-magnetic layer 6 in FIGS. 1A, 2A, and 2B) is 1 nm or less, a total thickness of the protective layer 7 and the lubrication layer 8 formed on the first non-magnetic layer 6 can be made to be about 3 nm or more. As a result, according to the present invention, the magnetic recording layer 5 is sufficiently protected to have good sliding characteristics, and the magnetic recording medium has a small spacing loss. The thickness of the protective layer 7 and the lubrication layer 8 is not particularly limited, but the protective layer 7 is preferably formed to have a thickness of 1 nm to 2 nm, and the lubrication layer 8 is preferably formed to have a thickness of 1 nm to 2 nm.

According to the magnetic recording medium of the present invention described above, a non-magnetic layer formed of a non-magnetic material positioned at the bottom surface of the concave portion exists on the magnetic recording layer for forming the convex portion of the concavo-convex pattern, and a thickness of the non-magnetic layer is 1 nm or less. Therefore, the resultant magnetic recording medium has a magnetic recording layer without the damage. In addition, surface of the convex portion and the concave portion in the concavo-convex pattern is substantially flattened, so that flying of the magnetic head above the magnetic recording medium by the airflow becomes stabilized. Such a magnetic recording medium has a total thickness which is thin and flattened even when a protective layer or the like is further formed on the non-magnetic layer 16 on the magnetic recording layer for forming the convex portion of the concavo-convex pattern, so that the spacing loss between the magnetic recording layer and the magnetic head mounted in the head slider can be made to be small, thereby prevent the magnetic recording and reproducing characteristics from deteriorating.

In addition, in the above-described embodiments, the base layer 2, the soft magnetic layer 3, and the alignment layer 4 which are below the magnetic recording layer 5 are formed on he substrate 1 in the magnetic recording medium of the present invention, however, the present invention is not limited thereto, but may properly change the structure below the magnetic recording layer 5 according to a kind of the magnetic recording medium. For example, any one or two layers of the base layer 2, the soft magnetic layer 3, and the alignment layer 4 may be omitted, and a recording layer may be directly formed on the substrate.

In addition, in the above-described embodiments, the magnetic recording medium of the present invention is a perpendicular recording type discrete track magnetic disk in which a magnetic recording layer is divided in a diameter direction of the track at a fine interval, however, the present invention is not limited thereto, buy may be applied to any one of a magnetic disk in which the magnetic recording layer is divided in a circumference direction (sector direction) of the track at a fine interval, a magnetic disk in which the magnetic recording layer is divided in both directions of diameter and circumference of the track at a fine interval, a PERM type magnetic disk having a magnetic recording layer with a continuous concavo-convex pattern as shown in FIG. 2B, and a magnetic disk in which the magnetic recording layer has a spiral shape.

(Method of Manufacturing a Magnetic Recording Medium)

Next, an example of a method of manufacturing the above-described magnetic recording medium will be described. FIGS. 3 to 5 are cross-sectional views for explaining a process of manufacturing the magnetic recording medium of the present invention.

A method of manufacturing a magnetic recording medium according to the present invention includes a step of forming a first non-magnetic layer 6 on a concavo-convex pattern resulted from providing a magnetic recording layer 5 on a substrate 1A in a predetermined pattern, a step of forming an etching monitoring layer 9 on the first non-magnetic layer 6, a step of forming a second non-magnetic layer 6b on the etching monitoring layer 9, and a step of etching at least the second non-magnetic layer 6b formed on the magnetic recording layer 5 forming a convex portion of the concavo-convex pattern. In addition, the etching step is a step of substantially flattening surface on the convex portion and the concave portion of the concavo-convex pattern, and includes a step of adjusting to zero or reducing an etching speed of the etching monitoring layer 9, an etching speed of the first non-magnetic layer 6, or an etching speed of the second non-magnetic layer 6b when the second non-magnetic layer 6b remains on the concave portion of the concavo-convex pattern after the etching monitoring layer 9 provided on the magnetic recording layer 5 forming the convex portion starts to be etched.

In this manufacturing method, the concave portion of the concavo-convex pattern is filled with at least one or more of the non-magnetic layers formed in each step after the first non-magnetic layer forming step, the etching monitoring layer forming step, and the second non-magnetic layer forming layer are carried out.

In addition, according to the present invention, a layer remaining on the magnetic recording layer 5 forming the convex layer after the etching step is carried out, is the non-magnetic layer 16 having the single layer structure composed of the first non-magnetic layer 6, or the non-magnetic layer 16 having the double-layer structure composed of the first non-magnetic layer 6 and the etching monitoring layer 9, and a thickness of the non-magnetic layer 16 having the single layer or double-layer structure is 1 nm or less.

In addition, the method of manufacturing the magnetic recording medium of the present invention preferably includes, for example, a step of forming the protective layer 7 or a step of forming the lubrication layer 8 on the layer etched with a thickness of 1 nm or less.

Hereinafter, a method of manufacturing the magnetic recording medium of the present invention will be described in detail with reference to FIGS. 3 and 4, however, the present invention is not limited thereto.

1) A Step of Forming a Magnetic Recording Layer Pattern

Figure 3A:
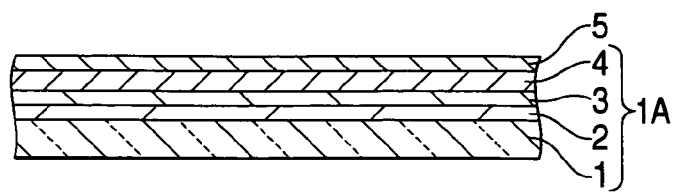
FIG. 3 is a cross-sectional view for explaining a process of manufacturing a magnetic recording medium of the present invention.
Figure 3B:
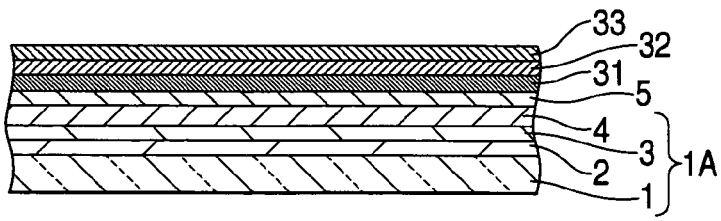

First, a substrate 1 is prepared, and a base layer 2, a soft magnetic layer 3, an alignment layer 4, and a magnetic recording layer 5, each having a predetermined thickness, are laminated on the substrate 1 in this order using, for example, a sputtering method (see FIG. 3A). A first mask layer 31 and a second mask layer 32 are laminated on the magnetic recording layer 5 in this order using, for example, a sputtering method, and a resist layer 33 is further laminated thereon using, for example, a dipping method or a spin-coating method (see FIG. 3B). In this case, the first mask layer 31 is formed of, for example, TiN, the second mask layer 32 is formed of, for example, Ni, and the resist layer 33 is formed of, for example, a negative resist (NEB22A manufactured by Sumitomo Chemical Co., Ltd.).

Figure 3C:
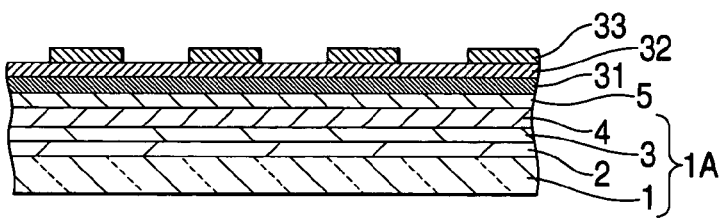
Figure 3D:
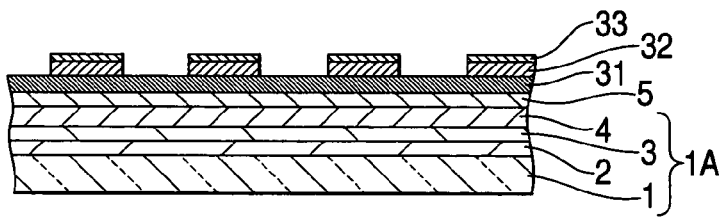
Figure 3E:
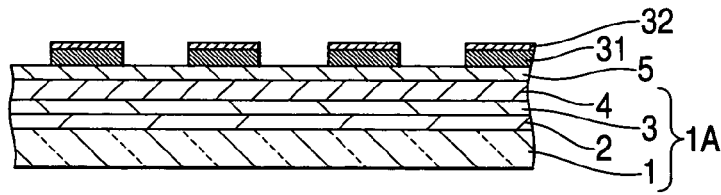

Next, a predetermined concavo-convex pattern is transferred to the resist layer 33 using a nanoimprint method to form a resist pattern, and the resist layer at the bottom surface of the concave portion of the resist pattern is removed by reactive ion beam etching which uses $O_2$ gas as a reaction gas (see FIG. 3C). In addition, the resist pattern may also be formed using a lithography method.

Next, the second mask layer 32 exposed at the bottom surface of the concave portion of the resist pattern is removed by the ion beam etching using, for example, Ar gas. In this case, the resist layer 33 formed in a region other than the concave portion is also a little removed (see FIG. 3D). Then, the first mask layer 31 located at the bottom surface of the concave portion is then removed by the reactive ion etching using, for example, $SF_6$ gas (see FIG. 3E). Accordingly, the magnetic recording layer 5 is exposed at the bottom surface of the concave portion. In addition, the resist layer 33 formed in a region other than the concave portion is completely removed, and the second mask layer 32 formed in a region other than the concave portion is partially removed, so that a small amount of it remains.

Figure 3F:
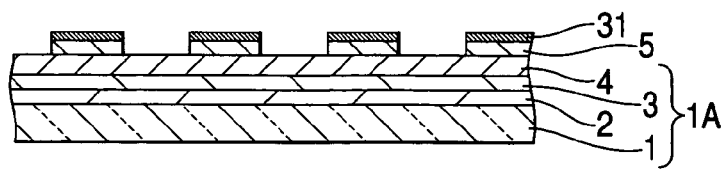

Next, the magnetic recording layer 5 exposed at the bottom surface of the concave portion is removed by the reactive ion etching using, for example, CO gas and $NH_3$ gas as reaction gases (see FIG. 3F). As a result, the magnetic recording layer 5 having a predetermined concavo-convex pattern is formed. In addition, by means of the reactive ion etching, the second mask layer 32 formed in a region other than the concave portion of the concavo-convex pattern is completely removed while the first mask layer 31 formed in a region other than the concave portion is partially removed. In addition, a small amount of the first mask layer 31 remains on the magnetic recording layer 5.

Figure 3G:
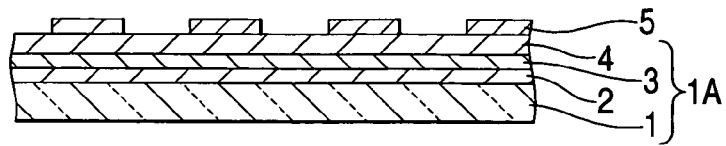

Next, by means of the reactive ion etching using $SF_6$ gas as a reaction gas, the first mask layer 31 remaining on the magnetic recording layer 5 serving as the convex portion of the concavo-convex pattern is completely removed (see FIG. 3G). In this way, the magnetic recording layer 5 having a predetermined concavo-convex pattern is formed. In this case, the residual reactive gas is removed by dry cleaning.

2) A Step of Forming a First Non-magnetic Layer

Figure 4A:
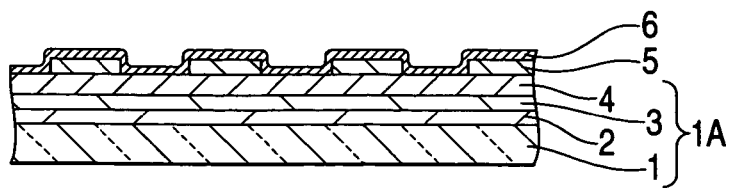
FIG. 4 is a cross-sectional view for explaining a process of manufacturing a magnetic recording medium of the present invention.

Next, a SiO2 film is formed as the non-magnetic material using a sputtering method, thereby forming the first non-magnetic layer 6 in the concave portion of the concavo-convex pattern positioned between the magnetic recording layers 5 and 5 and forming the non-magnetic layer 16 (first non-magnetic layer 6) formed of the same non-magnetic material as the first non-magnetic layer 6 on the magnetic recording layer 5 of the convex portion of the concavo-convex pattern (see FIG. 4A). In this case, any one of the above-described materials for forming the first non-magnetic layer 6 may be selected from the above-mentioned materials as a non-magnetic material for forming the first non-magnetic layer 6.

3) A Step of Forming an Etching Monitoring Layer

Figure 4B:
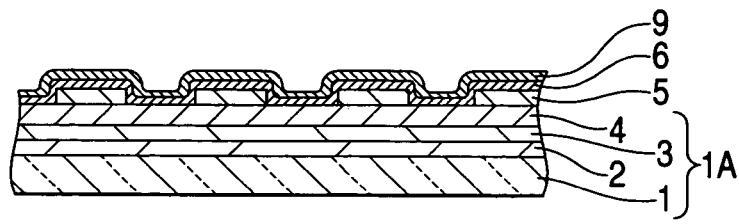

Next, an etching monitoring layer 9 is formed on the first non-magnetic layer 6 (see FIG. 4B). The etching monitoring layer 9 is not particularly limited if it is composed of elements or contains elements detectable during an etching step to be described later. Accordingly, the etching monitoring layer 9 may contain elements which are not contained in the first non-magnetic layer 6 or the second non-magnetic layer 6b. A material of forming the etching monitoring layer 9 may include, for example, a carbon material such as carbon, DLC or the like, an oxide material such as $Al_2O_3$, a metal material such as Ta (tantalum), W (tungsten) or the like. In addition, a mass spectrometer monitor or the like is used as the detecting means. A thickness of the etching monitoring layer 9 is preferably within a range of about 1 nm to 5 nm, however, the lowest limit is arbitrarily set from a relationship with a sensitivity of the detecting means, and the highest limit is arbitrarily set from a relationship with an etching rate of the etching monitoring layer.

In addition, when the etching monitoring layer 9 is formed of a material having a low etching rate, etching progress is temporarily delayed in the etching monitoring layer 9, so that a time margin is obtained to allow the etching condition to be changed for the delayed time. As a result, a thickness of the first non-magnetic layer 6 formed below the etching monitoring layer 9 can be controlled with high precision by the changed etching condition. A material for forming the etching monitoring layer 9 which delays the progress of the etching rate may include the above-describe materials, in particular, Ta, W or the like. In addition, the etching monitoring layer 9 is also formed in the concave portion, as shown in FIG. 4B.

4) A Step of Forming a Second Non-magnetic Layer

Figure 4C:
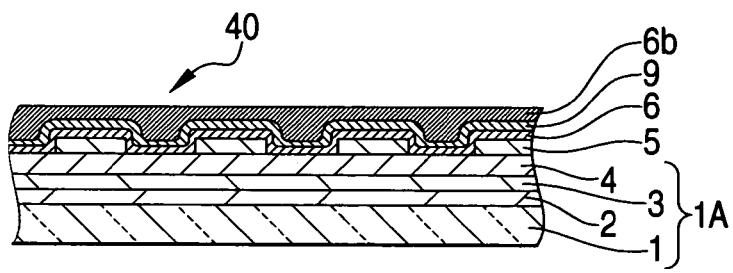

Next, a second non-magnetic layer 6b is formed on the etching monitoring layer 9 (see FIG. 4C). The second non-magnetic layer 6b is preferably formed of a material selected from the above-described non-magnetic materials forming the first non-magnetic layer 6, and is more preferably formed of the same material as the first non-magnetic layer 6. Since the second non-magnetic layer 6b and the first non-magnetic layer 6 are formed of the same material, it is not necessary to significantly change the etching condition in the etching step, so that the magnetic recording medium can be readily manufactured. In addition, the second non-magnetic layer 6b is also formed in the concave portion, as shown in FIG. 4C.

In the step of forming the second non-magnetic layer, the second non-magnetic layer is preferably formed while a bias power is applied to the substrate 1. In this way, the second non-magnetic layer is formed while the concavo-convex shape of the surface is suppressed, so that the surface of the magnetic recording medium can be effectively flattened.

An intermediate for a magnetic recording medium 40 is provided during the subsequent etching step as shown in FIG. 4C after the step of forming the second non-magnetic layer is carried out.

According to the intermediate for a magnetic recording medium 40, in particular, a magnetic recording layer 5 on the substrate 1A is provided in a predetermined concavo-convex pattern, a concave portion of the concavo-convex pattern is filled with a non-magnetic material, the non-magnetic layer 16 is formed on a convex portion of the concavo-convex pattern, and the intermediate for a magnetic recording medium relates to an aspect prior to the etching step in the process of manufacturing the magnetic recording medium of the present invention. Specifically, the non-magnetic layer is composed of at least three layers, and an intermediate layer among the three layers has an element different from elements of the two top and bottom layers. In addition, the three layers are formed such that the first non-magnetic layer 6, the etching monitoring layer 9, and the second non-magnetic layer 6b are laminated on the magnetic recording layer 5 in this order. According to the intermediate for a magnetic recording medium 40, the etching monitoring layer 9 formed between the first non-magnetic layer 6 and the second non-magnetic layer 6b in the process of manufacturing the magnetic recording medium is detected in its subsequent etching step, so that a thickness of the layer remaining on the magnetic recording layer 5 after etching can be readily controlled to 1 nm or less. As a result, it is possible to etch the thickness of the layer remaining on the magnetic recording layer 5 with high precision by using such an intermediate for a magnetic recording medium 40, which allows the magnetic recording medium having the small spacing loss to be provided.

5) An Etching Step

Figure 4D:
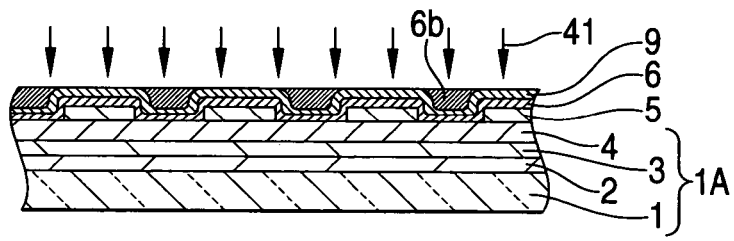
Figure 4E:
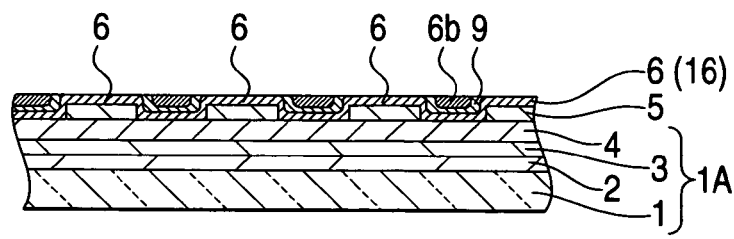
Figure 4F:
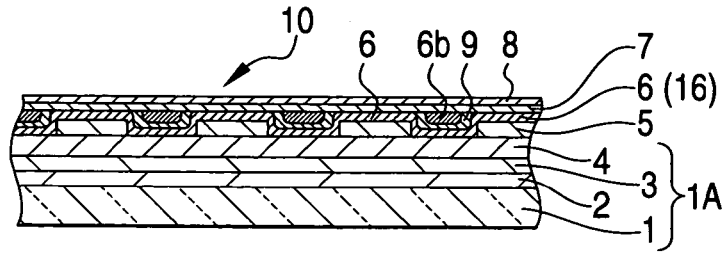

The etching step is a step of etching the second non-magnetic layer 6b and the etching monitoring layer 9 to make 1 nm or less a thickness of the first non-magnetic layer 6 on the magnetic recording layer 5 (see FIGS. 4D and 4E).

Specifically, a detecting means for detecting the etching monitoring layer 9 is first activated while a surface of a subject to be processed after the above-described step of forming the second non-magnetic layer is carried out is etched by ion beam etching. When the etching reaches the etching monitoring layer 9, an element constituting the etching the monitoring layer 9 or an element contained in the etching monitoring layer 9 is detected by the detecting means, and thus an etching speed is adjusted so as to make decrease an etching speed of the etching monitoring layer 9 after detection (this step is referred to as 'a step of adjusting an etching speed'). By such an etching step, a portion or all of the etching monitoring layer 9 and the second non-magnetic layer 6b on the magnetic recording layer 5 forming the convex portion can be removed. For example, as shown in FIG. 4E, by using the step of removing all of the etching monitoring layer 9 and the second non-magnetic layer 6b on the magnetic recording layer 5, a thickness of the non-magnetic layer 16 composed of the first non-magnetic layer 6 remaining on the magnetic recording layer 5 can be adjusted to 1 nm or less. In addition, as shown in FIG. 4E, a surface on the convex portion and the concave portion in the concavo-convex pattern can be formed without being stepped, so that it is possible to substantially flatten the surface.

In this case, when the etching continuously proceeds by decreasing the etching speed of the etching monitoring layer 9, a thickness of the non-magnetic layer 16 composed of the etching monitoring layer 9 and the first non-magnetic layer 6 still formed on the magnetic recording layer 5 typically exceeds 1 nm even though the etching monitoring layer 9 is detected.

In this etching step, an ion beam etching method using, for example, Ar gas is applied for the ion beam etching. When the etching must be further carried out after the etching monitoring layer 9 is detected as described above, the etching monitoring layer 9 is etched in a condition having a relatively fast etching rate until it is detected as shown in FIG. 4D, and is etched in a condition having a low etching rate after it is detected. Changing the etching rate can be made in response to an incident angle of an ion beam 41, an etching power, a gas pressure, a kind of gas or the like, and is arbitrarily set in consideration of a film formation condition or a property of a constituting material of the first non-magnetic layer 6, the etching monitoring layer 9, and the second non-magnetic layer 6b. For example, the incident angle of the ion beam can be changed from an incident angle having a high etching rate to an incident angle having a low etching rate after the etching monitoring layer 9 is detected, or a kind of gas can be changed from a gas having a high etching rate to a gas having a low etching rate.

In the present invention, such an etching step is included, so that the magnetic recording medium can be manufactured without damaging the magnetic recording layer 5 when a thickness of the non-magnetic layer 16 on the magnetic recording layer is made to be 1 nm or less. In addition, since the non-magnetic layer 16 remains on the magnetic recording layer 5 and its thickness is 1 nm or less, a total thickness on the magnetic recording layer can be made to be as thin as possible even when a protective layer or the like is further formed on the non-magnetic layer 16 using the step to be described below, so that the magnetic recording medium allowing the spacing loss between the magnetic recording layer and the magnetic head to be small can be readily manufactured.

In addition, in the present application, the 'ion beam etching' means a collection of methods of irradiating an ionized gas to the subject to be removed, such as ion milling, however, it is not limited to a processing method of making the narrowed ion beam irradiated. In addition, the 'incident angle' is an incident angle of the ion beam (ionized gas) to a surface of the subject, and means an angle formed by the surface of the subject and the central axis of the ion beam. For example, the incident angle is 0° when the central axis of the ion beam is parallel to the surface of the subject, and is 90° when the central axis of the ion beam is perpendicular to the surface of the subject.

6) A Step of Forming a Protective Layer and a Lubrication Layer:

In the magnetic recording medium of the present invention, the protective layer 7 or the lubrication layer 8 is formed on the non-magnetic layer 16 (for example, the first non-magnetic layer 6 shown in FIG. 4E) etched to a thickness of 1 nm or less in the etching step. For example, the protective layer 7 is formed on the non-magnetic layer 16 (for example, the first non-magnetic layer 6) having a thickness of 1 nm or less using a CVD (Chemical Vapor Deposition) method, and the lubrication layer 8 is formed on the protective layer 7 using a dipping method. Accordingly, formation of the magnetic recording medium of the present invention is finished, and the magnetic recording medium having good sliding characteristics resulted from the small spacing loss can be manufactured (see FIG. 4F). In addition, when the magnetic recording medium manufactured in this way is applied to a magnetic recording and reproducing device, the magnetic recording and reproducing characteristics can be prevented from deteriorating to the maximum.

In addition, in the method of manufacturing the magnetic recording medium of the present invention, as described above, any of the following cases may be employed: (i) both the second non-magnetic layer 6b and the etching monitoring layer 9 formed on the magnetic recording layer 5 are removed by etching, and the non-magnetic layer 16 remaining on the magnetic recording layer 5 has the single layer structure composed of only the first non-magnetic layer 6; (ii) a portion of the etching monitoring layer 9 and all of the second non-magnetic layer 6b formed on the magnetic recording layer 5 are removed by etching, and the non-magnetic layer 16 remaining on the magnetic recording layer 5 has the double-layer structure composed of the first non-magnetic layer 6 and a portion of the etching monitoring layer 9; and (iii) all of the etching monitoring layer 9 and the second non-magnetic layer 6b formed on the magnetic recording layer 5 are removed by etching, a portion of the first non-magnetic layer 6 is further removed, and the non-magnetic layer 16 remaining on the magnetic recording layer 5 has the single layer structure composed of only the portion of the first non-magnetic layer 6. Using these means such as the (i) to (iii) cases can implement the aspects illustrated in FIGS. 1A and 1B.

Other Embodiments

In other embodiments, for example, the concave portion of the concavo-convex pattern is filled with the first non-magnetic layer 6 can be given, as shown in FIGS. 2A and 2B. For example, FIG. 5 is a cross-sectional view for explaining a process of manufacturing the magnetic recording medium according to embodiments of FIG. 2A.

Figure 5A:
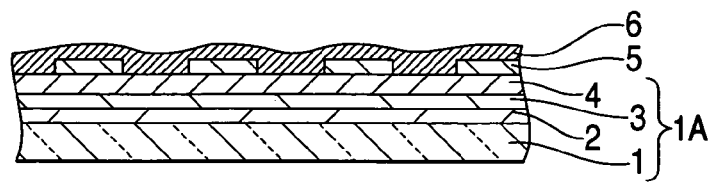
FIG. 5 is a cross-sectional view for explaining a process of manufacturing a magnetic recording medium according to another embodiment of the present invention.
Figure 5B:
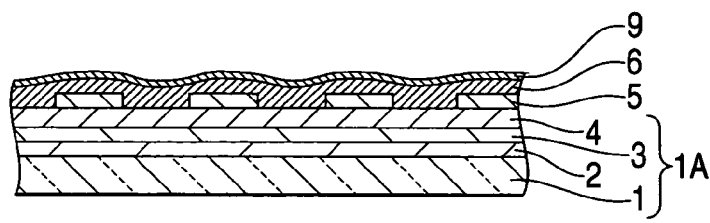
Figure 5C:
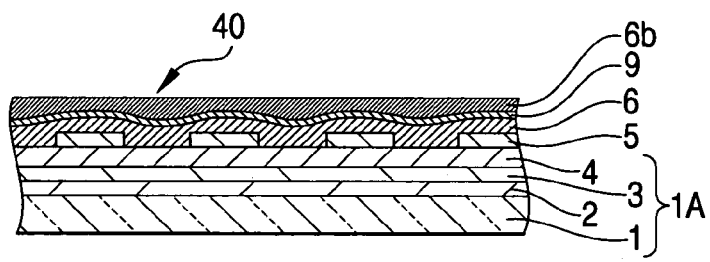
Figure 5D:
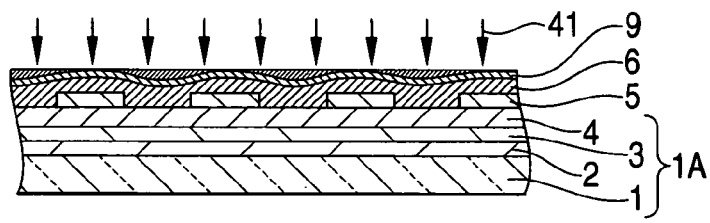
Figure 5E:
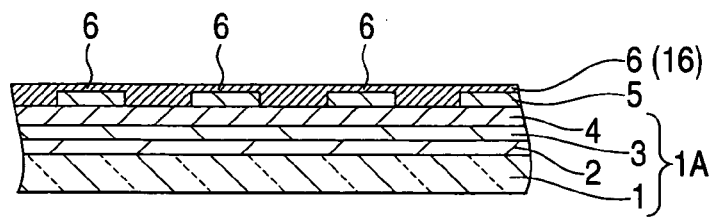
Figure 5F:
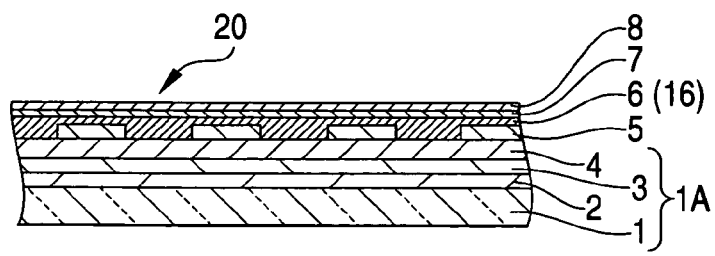

In the above-described step of forming the first non-magnetic layer, as shown in FIG. 5A, a film formation condition of the first non-magnetic layer 6 is changed to have a large thickness, so that the concave portion can be filled with the first non-magnetic layer 6. The magnetic recording medium according to this embodiment differs from the magnetic recording medium according to the embodiment shown in FIG. 4 in that the concave portion of the concavo-convex pattern is filled with only the first non-magnetic layer 6, but the same method as that described in each step can be applied. Therefore, a detailed description will be omitted in the present embodiment although it is shown in FIG. 5.

As such, according to the method of manufacturing the magnetic recording medium of the present invention, when the non-magnetic layer 16 on the magnetic recording layer 5 for forming the convex portion of the concavo-convex pattern has a thickness of 1 nm or less by means of the etching step, the magnetic recording medium can be manufactured without damaging the magnetic recording layer 5. In addition, in the manufactured magnetic recording medium, the non-magnetic layer 16 on the magnetic recording layer 5 for forming the convex portion of the concavo-convex pattern has a thickness of 1 nm or less, so that a total thickness of the layers formed on the magnetic recording layer 5 can be made to be as thin as possible even when a protective layer or the like is formed on the non-magnetic layer 16, thereby capable of readily manufacturing the magnetic recording medium allowing the spacing loss between the magnetic recording layer and the magnetic head to be small. In addition, since a thickness $T_1$ of the non-magnetic layer 16 on the magnetic recording layer 5 forming the convex portion of the concavo-convex pattern is 1 nm or less, a thickness of the layers composed of the protective layer 7 and the lubrication layer 8 formed on the non-magnetic layer 16 can be made to at least 3 nm. As a result, the magnetic recording medium having good sliding characteristics can be manufactured.

EXAMPLE

Hereinafter, the present invention will be described in detail with reference to the examples and a comparative example.

(Manufacturing of a Subject to be Processed)

First, the subject for forming the discrete track type magnetic recording medium was manufactured. A base layer 2, a soft magnetic layer 3, an alignment layer 4, a magnetic recording layer 5 (thickness: 20 nm), a first mask layer (TiN: 25 nm), and a second mask layer (Ni: 10 nm) were formed in this order on a disk substrate 1 which has a thickness of 635 μm and is formed of a glass substrate. A negative resist (NEB22A manufactured by Sumitomo Chemical Co., Ltd.) was applied on the formed sample using a spin coating method to form a resist layer having a thickness of 100 nm. Transfer by a press and reactive ion beam etching using O2 gas as a reaction gas were performed on the resist layer of the sample surface by means of a nano-imprint method using a stamper having a predetermined concavo-convex shape, thereby forming a resist pattern composed of a fine shape. Subsequently, the fine shape of the resist pattern was transferred to the second mask layer by means of the ion beam etching method using the resist pattern as a mask and using Ar gas as a reaction gas, thereby forming a second mask pattern composed of the fine shape. Subsequently, the fine shape of the second mask pattern was transferred to the first mask layer by means of the ion beam etching method using the second mask pattern as a mask and using $SF_6$ as a reaction gas, thereby forming the first mask pattern composed of the fine shape. Subsequently, the first mask pattern was used as a mask and Co gas and $NH_3$ gas were used as reaction gases. The fine shape of the first mask pattern was transferred to the magnetic recording layer 5 by means of the reactive ion etching method, thereby forming a magnetic recording layer pattern composed of the fine shape. Subsequently, the first mask layer remaining on the magnetic recording layer pattern was removed by the reactive ion etching method using $SF_6$ as a reaction gas.

By means of the above-described method, the subject to be processed for forming the discrete track type magnetic recording medium was manufactured. Processing dimensions of the magnetic recording layer pattern are as follows: the track pitch is 150 nm, the pattern width of the magnetic recording layer is 90 nm, and the depth of the concave portion is 20 nm.

Embodiment 1

A first non-magnetic layer 6 was formed on the concavo-convex pattern of the subject obtained as described above. First, the first non-magnetic layer 6 was formed with a thickness of 3 nm using a method of sputtering $SiO_2$ serving as the non-magnetic material in conditions of a film formation power (power applied to the target) RF500W and an Ar gas pressure of 0.3 Pa. Subsequently, an etching monitoring layer 9 was formed with a thickness of 2 nm on the first non-magnetic layer 6 using a method of sputtering Ta in conditions of a film formation power DC500W and an Ar gas pressure of 0.3 Pa. Subsequently, a second non-magnetic layer 6b was formed with a thickness of 95 nm on the etching monitoring layer 9 using a method of sputtering $SiO_2$ serving as the non-magnetic material in conditions of a film formation power RF500W, an Ar gas pressure of 0.3 Pa, and a bias power applied to the subject RF150W. In addition, the layer thickness described herein is a layer on the magnetic recording layer 5 forming the convex portion.

Figure 6:
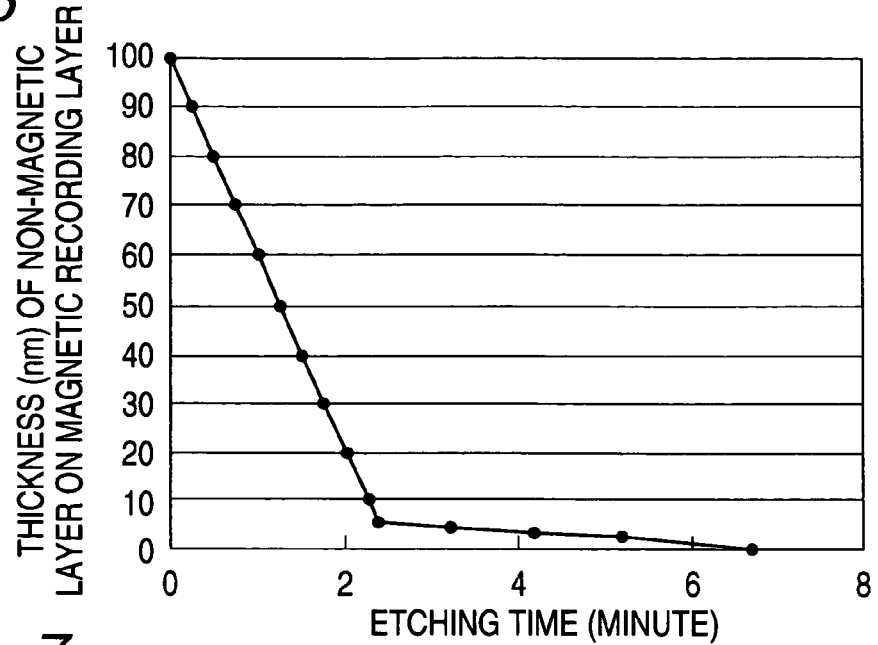
FIG. 6 is a graph showing a relationship between an etching time and thicknesses of non-magnetic layers (first non-magnetic layer, etching monitoring layer, and second non-magnetic layer) on a magnetic recording layer forming a convex portion of a concavo-convex pattern.

Ion beam etching having an incident angle of 8° using Ar was carried out on the subject after the first non-magnetic layer 6, the etching monitoring layer 9, and the second non-magnetic layer 6b were sequentially formed on the magnetic recording layer 5 until Ta constituting the etching monitoring layer 9 was detected by a mass spectrometer. In this case, the beam voltage was 700 V and the beam current was 1100 mA. A secondary ion mass spectrometry (SIMS) was employed as the mass spectrometer. After the etching monitoring layer 9 was detected, the incident angle of the ion beam of Ar in the etching condition for making the etching rate decrease was changed to 1° to keep etching. In addition, FIG. 6 is a graph illustrating relationships between an etching time and a thickness of the non-magnetic layer (that is, first non-magnetic layer 6, the etching monitoring layer 9, and the second non-magnetic layer 6b) on the magnetic recording layer 5 forming the convex portion of the concavo-convex pattern. As can be seen from FIG. 6, etching was performed with an etching rate of about 40 nm/min until the etching monitoring layer 9 was detected, however, was performed with an etching rate of about 1 nm/min after the etching monitoring layer 9 was detected. In addition, the beam voltage was changed to 500 V and the beam current was changed to 200 mA to perform etching at an etching rate of about 1 nm/min at the same time when it was determined that the first non-magnetic layer 6 ($SiO_2$) started to be detected due to a decreased detection amount of Ta constituting the etching monitoring layer 9 by means of SIMS. The first non-magnetic layer 6 formed on the magnetic recording layer 5 was etched using the etching rate and the etching time until its thickness reached 0.5 nm. A protective layer 7 formed of DLC was formed thereon to have a thickness of 2 nm using the CVD method, and a lubrication layer 8 formed of perfluoropolyether (PFPE) was formed thereon to have a thickness of 1 nm using the dipping method.

According to the magnetic recording medium manufactured in the above-described manner, a total thickness T of a layer including the non-magnetic layer 16 composed of the first non-magnetic layer 6 provided on the magnetic recording layer 5 forming the convex portion of the concavo-convex pattern, the protective layer 7, and the lubrication layer 8 was 3.5 nm, as shown in FIG. 1A. In addition, ten magnetic recording media according to the embodiment 1 were manufactured, and the total thickness thereof was measured by observing the cross-section of the magnetic recording medium by means of a Transmission Electron Microscope (TEM), so that a standard deviation of the thickness being 0.05 nm was obtained, which allows a flat magnetic recording medium having an extremely small deviation to be manufactured.

Comparative Example 1

The same procedure as the embodiment 1 was performed, except that a step of forming the etching monitoring layer performed in the embodiment 1 was omitted and changing the etching condition was not carried out during the process, thereby manufacturing a magnetic recording medium of the comparative example 1. In addition, the thickness of $SiO_2$ after the first non-magnetic layer 6 and the second non-magnetic layer 6b were formed on the magnetic recording layer 5 was made to 100 nm, and ion beam etching (a beam voltage of 700 V and a beam current of 1100 mA) having an incident angle of 8° using Ar was carried out with respect to the step of etching the subject. The etching time at this time was made to 2.49 minutes from relationships between the etching rate and the previously measured etching time, and etching was carried out until the thickness of the non-magnetic layer 16 formed on the magnetic recording layer 5 reached 0.5 nm. The protective layer 7 formed of DLC was formed thereon to have a thickness of 2 nm using the CVD method, and a lubrication layer 8 formed of PFPE was formed thereon to have a thickness of 1 nm using the dipping method. In addition, ten magnetic recording media according to the present comparative example 1 were manufactured, and the total thickness of a layer including the non-magnetic layer 16, the protective layer 7, and the lubrication layer 8 was measured using the same method as the embodiment 1, thereby obtaining a standard deviation of the thickness being 0.5 nm. Therefore, the deviation increases as compared to the above-described embodiment 1.

(Relationship Between a Thickness of a Non-magnetic Layer and a Head Flying Height)

Figure 7:
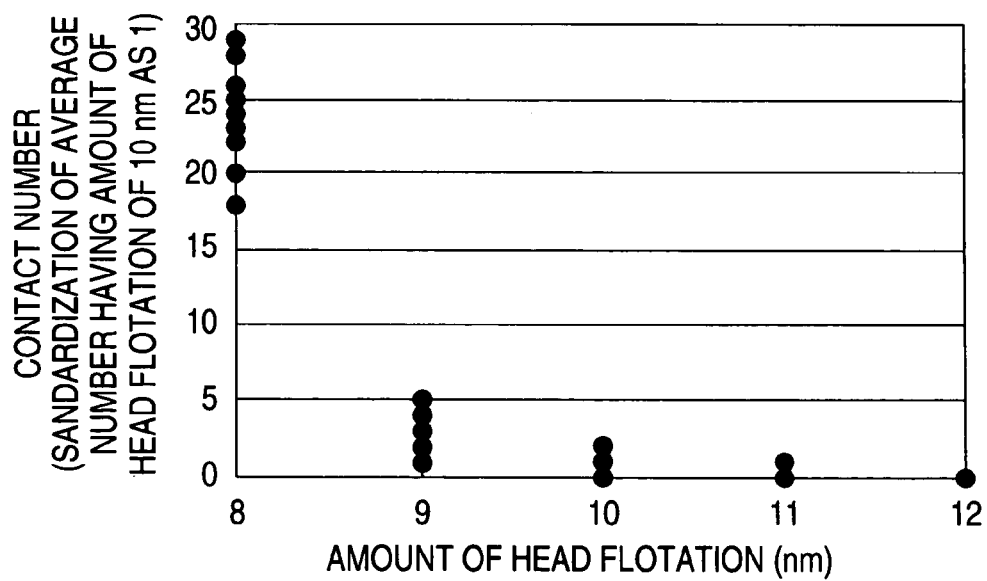
FIG. 7 is a graph showing a relationship between a head flying height and the contact number.
Figure 8:
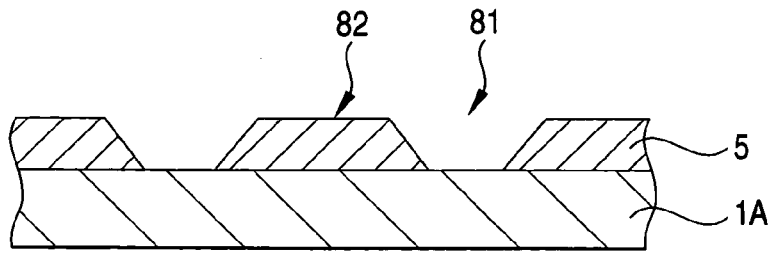
FIG. 8 is a schematic view for explaining a range of a convex portion of a concavo-convex pattern.

A relationship between a thickness of the non-magnetic layer 16 (first non-magnetic layer 6, or first non-magnetic layer 6 and etching monitoring layer 9) formed on the magnetic recording layer 5 and a head flying height was examined. When the non-magnetic layer 16 is provided on the magnetic recording layer 5, it is necessary to decrease the head flying height so as to suppress the spacing loss depending on a distance from the magnetic recording layer to the head. FIG. 7 is a graph illustrating the number of contact between the head and a surface of the magnetic recording medium when a glide-height test was carried out while changing the head flying height. The measurement was obtained by making the head scanned on the entire surface of 2.5-inch media composed of the conventional continuous layer medium to count the number of contact between the head and the surface of the magnetic recording medium, which was standardized to have the average number of the contact of head flying height by 10 nm as one.

In a range of the head flying height of 12 nm to 10 nm, the head flied almost in a stable manner, however, the number of contact rapidly increased by more than twenty times when the head flying height was made to 8 nm. This is because a slight protrusion or undulation which may exist on the surface of the magnetic recording medium is significantly apt to be in contact with the head when the head flying height decreases to 8 nm. In the meantime, in order to implement a magnetic recording and reproducing device achieving a high recording density and the small spacing loss, it is effective to make a distance from the surface of the magnetic recording layer to the head 10 nm or less in consideration of the spacing loss. However, which a frequent contact may be generated between the head and the magnetic recording layer when the head flying height decreases to 8 nm or less as described in the above result. This is why the thickness of the non-magnetic layer 16 formed on the magnetic recording layer 5 is made to be 1 nm or less, as in the magnetic recording medium of the present invention, so that the amount of decreasing the head flying height can be made to be 1 nm to less so as to maintain the spacing loss in a case of not having the non-magnetic layer 16 on the magnetic recording layer 5. Accordingly, the head can be advantageously suppressed from coming into contact with the surface of the magnetic recording medium while the spacing loss based on the distance between the magnetic recording layer and the head can be suppressed.

What is claimed is:

1. A method of manufacturing a magnetic recording medium, the method comprising the steps of:
    forming a magnetic recording layer in a predetermined concavo-convex pattern on a substrate;
    forming a first non-magnetic layer on the concavo-convex pattern;
    forming an etching monitoring layer on the first non-magnetic layer;
    forming a second non-magnetic layer on the etching monitoring layer; and
    etching at least the second non-magnetic layer formed on the magnetic recording layer forming a convex portion of the concavo-convex pattern,
    wherein a concave portion of the concavo-convex pattern is filled with at least one kind or more of the non-magnetic layer formed in each step after the first non-magnetic layer forming step, the etching monitoring layer forming step, and the second non-magnetic layer forming step are carried out, and
    wherein the etching step is a step of substantially flattening a surface on the convex portion and the concave portion, and includes a step of adjusting to zero or decreasing an etching speed of the etching monitoring layer, an etching speed of the first non-magnetic layer, or an etching speed of the second non-magnetic layer when the second non-magnetic layer remains on the concave portion of the concavo-convex pattern after the etching monitoring layer provided on the magnetic recording layer forming the convex portion starts to be etched, and
    the first non-magnetic layer and the second non-magnetic layer are formed of a same material.

2. The method of manufacturing a magnetic recording medium according to claim 1, wherein a layer remaining on the magnetic recording layer forming the convex portion after the etching step is carried out, is a non-magnetic layer, having a single-layer structure, composed of the first non-magnetic layer, or a non-magnetic layer, having a two-layer structure, composed of the first non-magnetic layer and the etching monitoring layer, and a thickness of the non-magnetic layer having the single-layer or two-layer structure is 1 nm or less.

* * * * *